(12) United States Patent
Aimone et al.

(10) Patent No.: US 9,725,793 B2
(45) Date of Patent: Aug. 8, 2017

(54) TANTALUM BASED ALLOY THAT IS RESISTANT TO AQUEOUS CORROSION

(75) Inventors: Paul R. Aimone, Bridgewater, MA (US); Evan Hinshaw, Hickory, NC (US)

(73) Assignee: H.C. STARCK INC., Newton, MA (US)

( * ) Notice: Subject to any disclaimer, the term of this patent is extended or adjusted under 35 U.S.C. 154(b) by 1598 days.

(21) Appl. No.: 12/109,765

(22) Filed: Apr. 25, 2008

(65) Prior Publication Data

US 2008/0267809 A1 Oct. 30, 2008

Related U.S. Application Data

(60) Provisional application No. 60/914,474, filed on Apr. 27, 2007.

(51) Int. Cl.
*C22C 27/02* (2006.01)
*C22B 34/24* (2006.01)
*C22B 9/20* (2006.01)
*C22B 9/22* (2006.01)

(52) U.S. Cl.
CPC ............... *C22C 27/02* (2013.01); *C22B 9/20* (2013.01); *C22B 9/22* (2013.01); *C22B 34/24* (2013.01)

(58) Field of Classification Search
None
See application file for complete search history.

(56) References Cited

U.S. PATENT DOCUMENTS

| | | | | |
|---|---|---|---|---|
| 1,167,827 A | * | 1/1916 | Kaiser | 419/46 |
| 3,109,734 A | * | 11/1963 | Bishop et al. | 420/427 |
| 3,183,085 A | * | 5/1965 | France et al. | 420/427 |
| 3,592,639 A | * | 7/1971 | Schussler et al. | 420/427 |
| 3,775,096 A | | 11/1973 | Guidotti et al. | |
| 4,062,679 A | | 12/1977 | Marsh et al. | |
| 4,784,830 A | | 11/1988 | Ganesan et al. | |
| 6,800,392 B2 | | 10/2004 | Jantsch et al. | |
| 2007/0056660 A1 | | 3/2007 | Aoki et al. | |
| 2008/0267809 A1 | | 10/2008 | Aimone et al. | |

FOREIGN PATENT DOCUMENTS

| | | | | |
|---|---|---|---|---|
| DE | 1164675 | * | 3/1964 | ............. C22C 27/00 |
| DE | 1199005 | | 8/1965 | |
| GB | 1072829 | | 6/1967 | |
| JP | 04021736 | | 1/1992 | |

(Continued)

OTHER PUBLICATIONS

ASM Handbook vol. 2 Properties and Selection: Nonferrous Alloys and Special-Purpose Materials, Joseph Davis ed., ASM International, 10th ed. 1990.*

(Continued)

*Primary Examiner* — Yoshitoshi Takeuchi
(74) *Attorney, Agent, or Firm* — Morgan, Lewis & Bockius LLP

(57) ABSTRACT

A tantalum or tantalum alloy which contains pure or substantially pure tantalum and at least one metal element selected from the group consisting of Ru, Rh, Pd, Os, Jr, Pt, Mo, W and Re to form a tantalum alloy that is resistant to aqueous corrosion. The invention also relates to the process of preparing the tantalum alloy.

4 Claims, 8 Drawing Sheets

(56) References Cited

FOREIGN PATENT DOCUMENTS

| WO | WO-91/19015 | 12/1991 |
| WO | WO-02/05863 | 1/2002 |

OTHER PUBLICATIONS

U.S. Appl. No. 12/498,770, filed Jul. 7, 2009, Aimone et al.
Frank T. Sisco & Edward Epremian, "Columbium and Tantalum", John Wiley & Sons, Inc., Copyright 1963, pp. 308-310.
GL Miller, "Tantalum and Niobium", Academic Press Inc. Publishers, Copyright 1959, pp. 433-439.
Paul Aimone et al, Working with Tantalum and Tantalum Alloys, 2003 NACE Conference proceedings.
Gypen L A et al., "Corrosion resistance of tantalum base alloys. Elimination of hydrogen embrittlement in tantalum by substitutional alloyin" vol. 35, No. 2, Feb. 1, 1984 pp. 37-46.
Search Report and Written Opinion from International Searching Authority dated Aug. 6, 2008.
International Search Report for PCT/US10/41043.
U.S. Appl. No. 12/915,781, filed Oct. 29, 2010, Aimone et al.
U.S. Appl. No. 12/915,681, filed Oct. 29, 2010, Aimone et al.
Environmental Effects on Engineered Materials 170-172 (Russell Jones ed., 2001).
Corrosion Engineering Handbook 181 (Philip Schweitzer ed., 1996).

\* cited by examiner

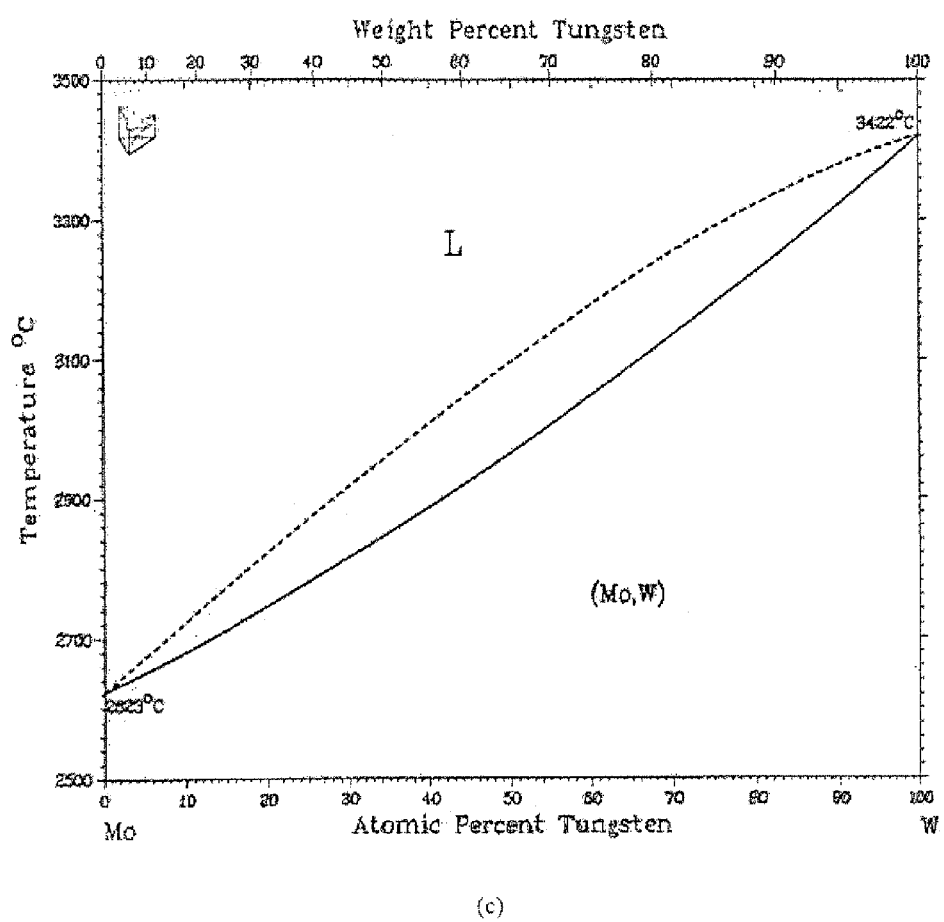
Figure 1 – Phase Diagrams for (a) Ta-W, (b) Ta-Mo, and (c) Mo-W systems.

US 9,725,793 B2

TANTALUM BASED ALLOY THAT IS RESISTANT TO AQUEOUS CORROSION

RELATED APPLICATIONS

This application claims benefit to U.S. Provisional Application Ser. No. 60/914,474 filed Apr. 27, 2007 which is incorporated by reference in its entirety for all useful purposes.

FIELD OF THE INVENTION

The invention is directed to tantalum or tantalum based alloys that are resistant to aqueous corrosion, more particularly to corrosion from acids and resistant to hydrogen embrittlement. The tantalum or tantalum based alloy has superior resistance to hydrogen absorption (and subsequent hydrogen embrittlement) as compared to pure tantalum and Ta-3W (referred to as "NRC76").

BACKGROUND OF THE INVENTION

Pure tantalum and tantalum alloys begin to become significantly hydrogen embrittled at hydrogen concentrations greater than 100 ppm. In the chemical processing industry (CPI), pure tantalum will absorb hydrogen and become embrittled when exposed to hot HCl and hot $H_2SO_4$ at conditions illustrated in FIGS. 2 and 3. Ta-3W has demonstrated better resistance to hydrogen absorption than pure tantalum. Where tantalum and tantalum alloys are used in the CPI to contain very hot and concentrated acids, hydrogen embrittlement, rather than a loss of wall thickness due to corrosion, is the predominant failure mechanism.

U.S. Pat. No. 4,784,830 discloses that oxidation resistance of alloys can be improved by a controlled addition and retention of nitrogen. Put another way, it has been discovered that the microstructure of the alloys of the type under consideration, notably grain size, can be controlled or rendered relatively structurally stable over extended periods at elevated temperature through a microalloying addition of nitrogen. In addition, and most advantageously, a special ratio of silicon to titanium should be observed in seeking extended service life as will be shown herein.

U.S. Pat. No. 3,592,639 relates to a ternary Ta-W alloy which contains from 1.5 to 3,5 percent of tungsten. Niobium can also be present in the alloy from 0.05 to 0.5 weight percent. Molybdenum is limited to 0.5% maximum (less than 5000 p.p.m.) to promote smaller grain size in the alloy.

U.S. Pat. No. 4,062,679 claims a wrought tantalum product of, substantially pure tantalum containing less than 300 parts per million of columbium, less than 200 parts per million of iron, chromium and nickel combined, less than 50 parts per million of tungsten, less than 10 parts per million of molybdenum, less than 30 parts per million of chromium, and less than 20 parts per million of calcium, the improvement which comprises the inclusion of from about 50 to about 700 parts per million of silicon in the composition of said product whereby said product is improved in resistance to embrittlement when exposed to elevated temperatures in an oxygen-containing environment.

SUMMARY OF THE INVENTION

The invention relates to a process of improving hydrogen embrittlement resistance by microalloying at least one metal element selected from the group consisting of Ru, Rh Pd, Os, Ir, Pt, Mo, W and Re with a pure or substantially pure tantalum or a tantalum alloy.

One preferred embodiment of this invention would add platinum to NRC76. The chemical process industry is seeking new tantalum alloys that will permit greater operating temperatures in their process equipment.

An object of the invention is to have an improved tantalum alloy which is more resistant to aqueous corrosion and hydrogen embrittlement.

A tantalum alloy which comprises pure or substantially pure tantalum or a tantalum alloy and at least one metal element selected from the group consisting of Ru, Rh Pd, Os, Ir, Pt, Mo, W and Re to form a tantalum alloy that is resistant to aqueous corrosion.

The metal element(s) can be in an amount up to the solubility limit of metal in the tantalum.

DETAILED DESCRIPTION OF THE INVENTION

Figure 1:
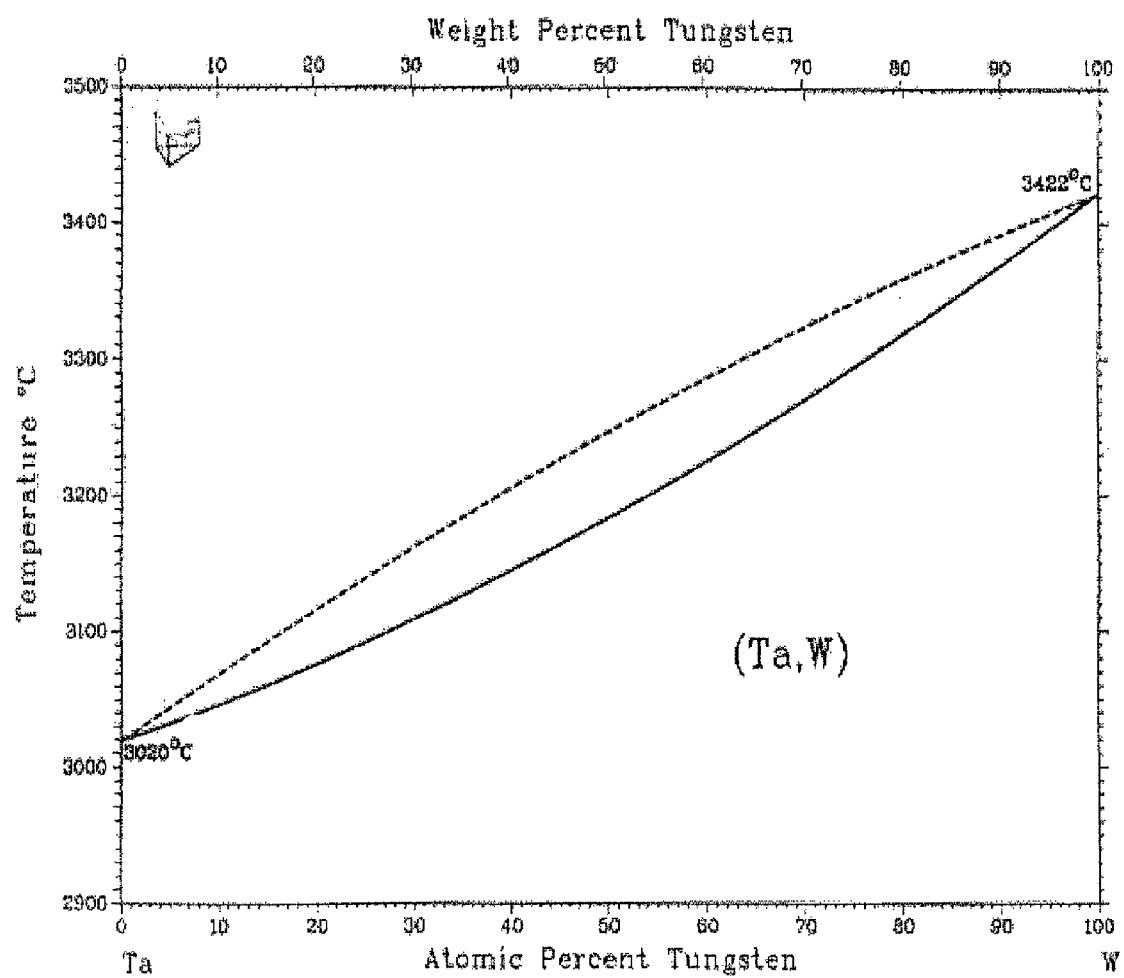
FIG. 1 illustrates the addition of molybdenum since it has the same crystal structure, a similar lattice parameter, and complete solid solubility in both tantalum and tungsten.
Figure 1:
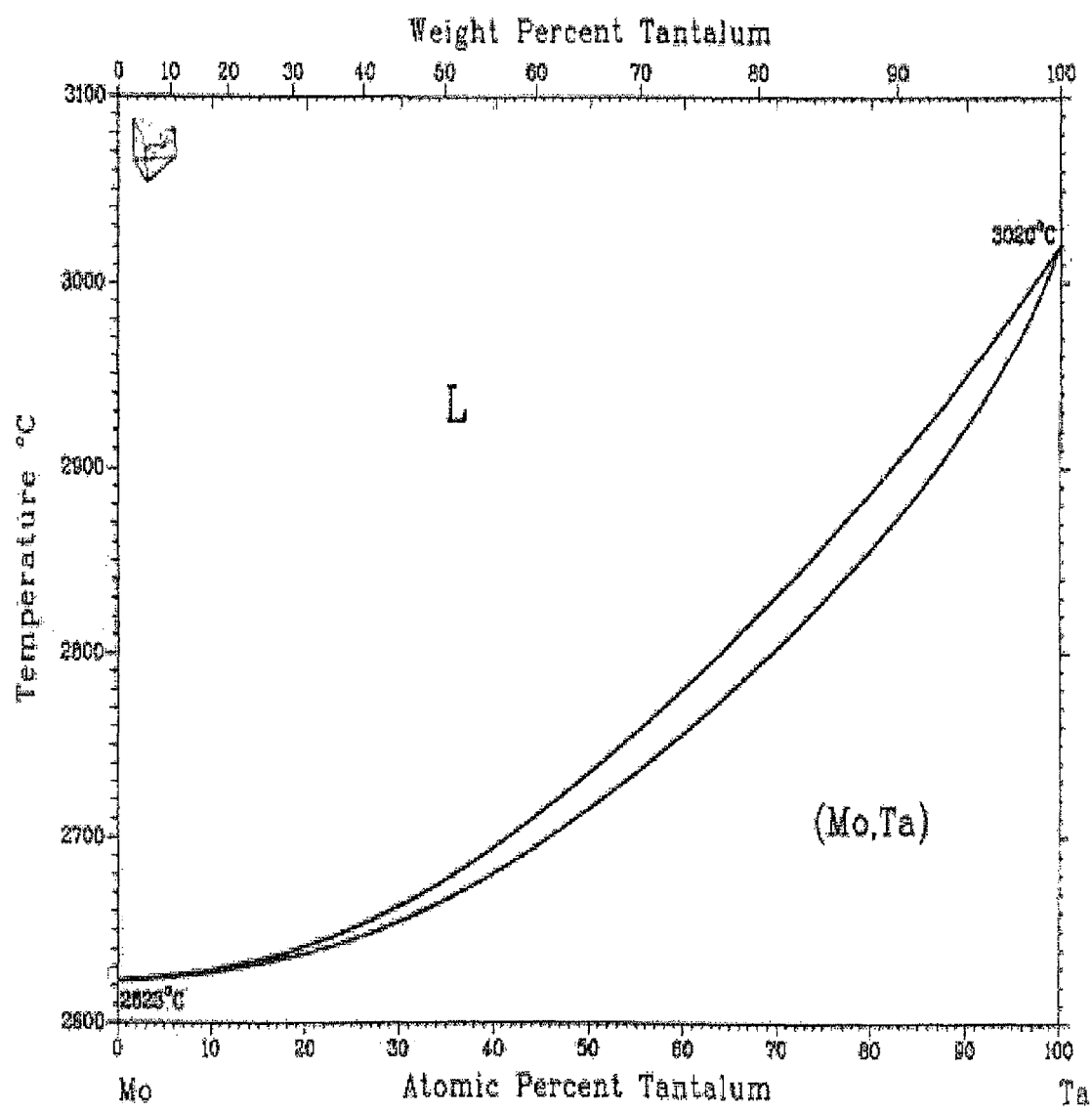
Figure 2:
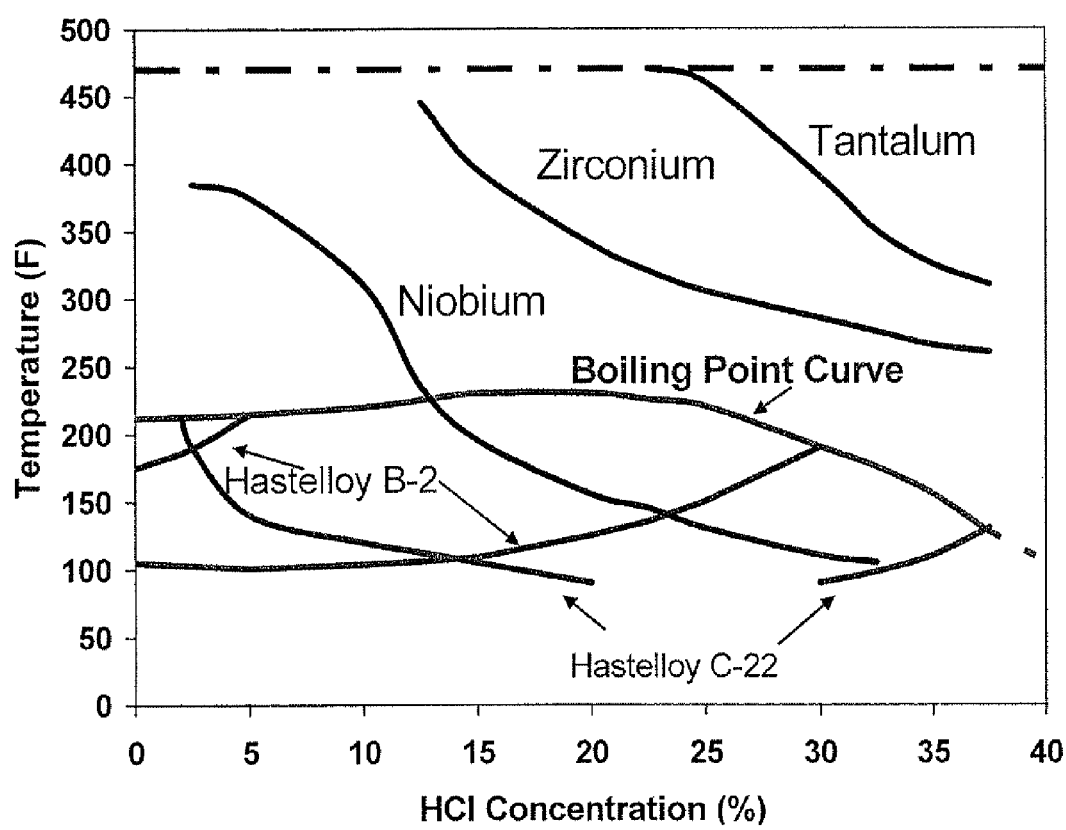
FIG. 2 illustrates the conditions for the chemical processing industry that pure tantalum will absorb hydrogen and become embrittled when exposed to hot HCl.
Figure 3:
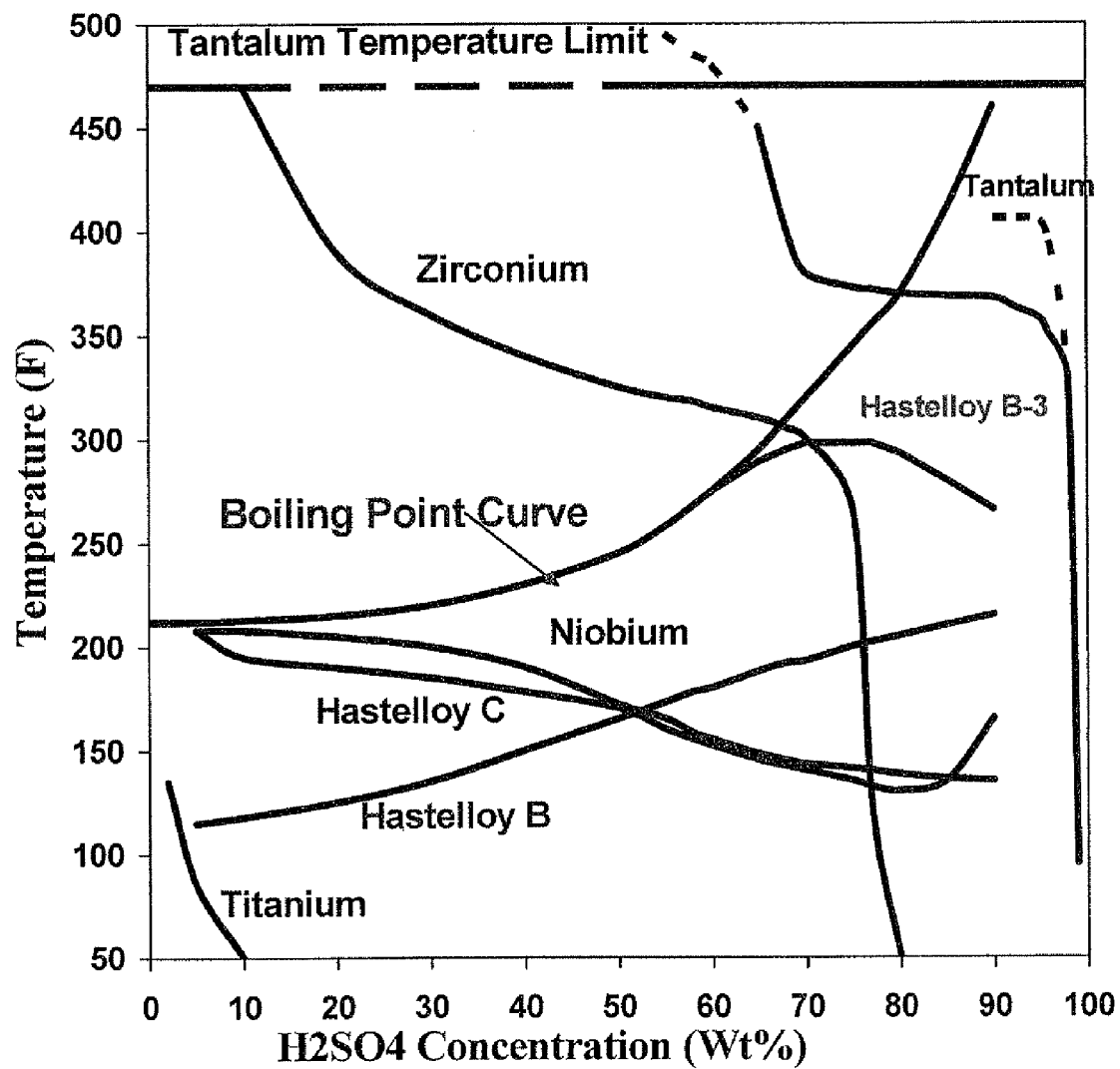
FIG. 3 illustrates the conditions for the chemical processing industry that pure tantalum will absorb hydrogen and become embrittled when exposed to hot $H_2SO_4$.

As used herein, the singular terms "a" and "the" are synonymous and used interchangeably with "one or more." Accordingly, for example, reference to "a metal" herein or in the appended claims can refer to a single metal or more than one metal. Additionally, all numerical values, unless otherwise specifically noted, are understood to be modified by the word "about."

A tantalum or tantalum based alloy that is resistant to aqueous corrosion, more particularly to corrosion from acids and resistant to hydrogen embrittlement. The starting tantalum is pure or substantially pure. Substantially pure tantalum would be a tantalum alloy which has up to about 11% by weight of non-tantalum components.

The tantalum or tantalum based alloys are preferably prepared using a vacuum melting process. Vacuum arc remelting (VAR), electron beam melting (EBM) or plasma arc melting (PAM) are methods of vacuum melting that can also be used for alloying. To formulate the actual alloy, at least one element selected from the group consisting of ruthenium, rhodium, palladium, osmium, iridium, platinum, molybdenum, tungsten, and ruthenium (Ru, Rh Pd, Os, Ir, Pt, Mo, W and Re) are added to the pure tantalum material or substantially pure tantalum material or tantalum alloy using one of the vacuum melting processes listed above. The tantalum alloy preferably contains tungsten with platinum, molybdenum or rhenium or mixtures thereof. Although it is noted that VAR, EBM or PAM could all be used. The preferred technique would be VAR.

Alternative embodiments of this invention could include adding elements other than the elements listed above that improve the corrosion and hydrogen embrittlement resistance. These additional elements could include yttrium, gold, cerium, praseodymium, neodymium, and thorium.

Each of the metals would preferably be less than 10,000 ppm of the alloy, preferably less than 5,000 ppm of the total amount of the alloy and more preferably less 2,000 ppm of the total amount of alloy. The metal preferably would be added in an amount of at least 50 ppm, preferably at least 100 ppm, preferably at least 150 ppm, preferably at least 200 ppm and preferably at least 250 ppm.

Examples of tantalum alloys that contain at least 89% tantalum include, but are not limited to Ta-3W (tantalum-tungsten) contains at about 3% tungsten), Ta-3W—Pt (tantalum-tungsten and platinum alloy) which contains about 3% tungsten), the tantalum Ta-3W—Mo (tantalum-tungsten and molybdenum alloy) which contains about 3% tungsten), and Ta-3W—Re alloys (tantalum-tungsten and rhenium alloy) which contains about 3% tungsten). The Ta-3W—Pt, Ta-3W—Mo and Ta-3W—Re would be formulated and manufactured in a manner similar that used to make Ta-3W alloys. The alloys are preferably made by microalloying the other metals with the Ta-3W (tantalum-tungsten) alloy.

The addition of platinum would be the most preferred embodiment since platinum has the greatest number of free electrons to theoretically pull in additional oxygen atoms to close the holes in the $Ta_2O_5$ oxide layer and/or provide sites of low hydrogen overvoltage thereby stabilizing the $Ta_2O_5$ oxide layer.

Another preferred embodiment would use the addition of ruthenium, rhodium, palladium, osmium, and iridium (also known as "platinum group metals, PGM) which also would provide sites of low hydrogen overvoltage thereby stabilizing the $Ta_2O_5$ oxide layer.

Still another preferred embodiment would use the addition of molybdenum since it has the same crystal structure, a similar lattice parameter, and complete solid solubility in both tantalum and tungsten. This is shown in Table I and FIG. 1.

TABLE I

Crystal Structure and Lattice Parameters for Refractory Elements

| Element | Symbol | Crystal Structure | Lattice Parameter (Å) |
|---|---|---|---|
| Tantalum | Ta | body centered cubic (bcc) | 3.296 |
| Tungsten | W | body centered cubic (bcc) | 3.16 |
| Molybdenum | Mo | body centered cubic (bcc) | 3.15 |
| Platinum | Pt | face centered cubic (fcc) | 3.931 |
| Rhenium | Re | hexagonal close packed (hcp) | a = 2.761, c = 4.458 |

Another preferred embodiment would use the addition of rhenium since rhenium has the same crystal structure and a similar lattice parameter to tantalum and tungsten.

Tantalum ingots formulated using VAR or PAM would then be used to produce plate, sheet, and tube products in a manner similar to that used to manufacture these same products from pure tantalum or Ta-3W alloy.

The plate, sheet, and tube products manufactured using the Ta-3W—Mo, Ta-3W—Re, or Ta-3W—Pt alloys would be used in a manner identical to that for from pure tantalum or Ta-3W alloys.

The advantages of the new alloys would be superior corrosion and hydrogen embrittlement resistance over pure Ta-3W. The addition of platinum would be the preferred embodiment since platinum has the greatest number of free electrons to theoretically pull in additional oxygen atoms and help close the holes in the $Ta_2O_5$ oxide layer and/or provide sites of low hydrogen overvoltage thereby stabilizing the $Ta_2O_5$ oxide layer.

Samples were made using either a laser additive manufacturing (LAM) or traditional vacuum arc remeltiing (VAR) techniques. In the former technique, tantalum, tungsten, and platinum powders were blended together in the desire composition and then melted using and consolidated using a laser under inert conditions. In these samples, the final tantalum alloy contained 2.8 weight percent tungsten with 500 ppm platinum. In the latter technique, tantalum and platinum powders were blended together in the desire composition, pressed into a powder leech, and welded to the side of an NRC76 bar (this assembly herein referred to as the "electrode"). The electrode was then melted using traditional vacuum arc remelting (VAR) techniques. In these samples, the final tantalum alloy contained 2.8 weight percent tungsten with up to 10,000 ppm platinum.

Corrosion tests in hydrochloric and sulfuric acids were conducted for up to a four month time period. The platinum modified alloy had a corrosion rate that was always lower than NRC76 with almost no hydrogen enrichment.

Figure 4:
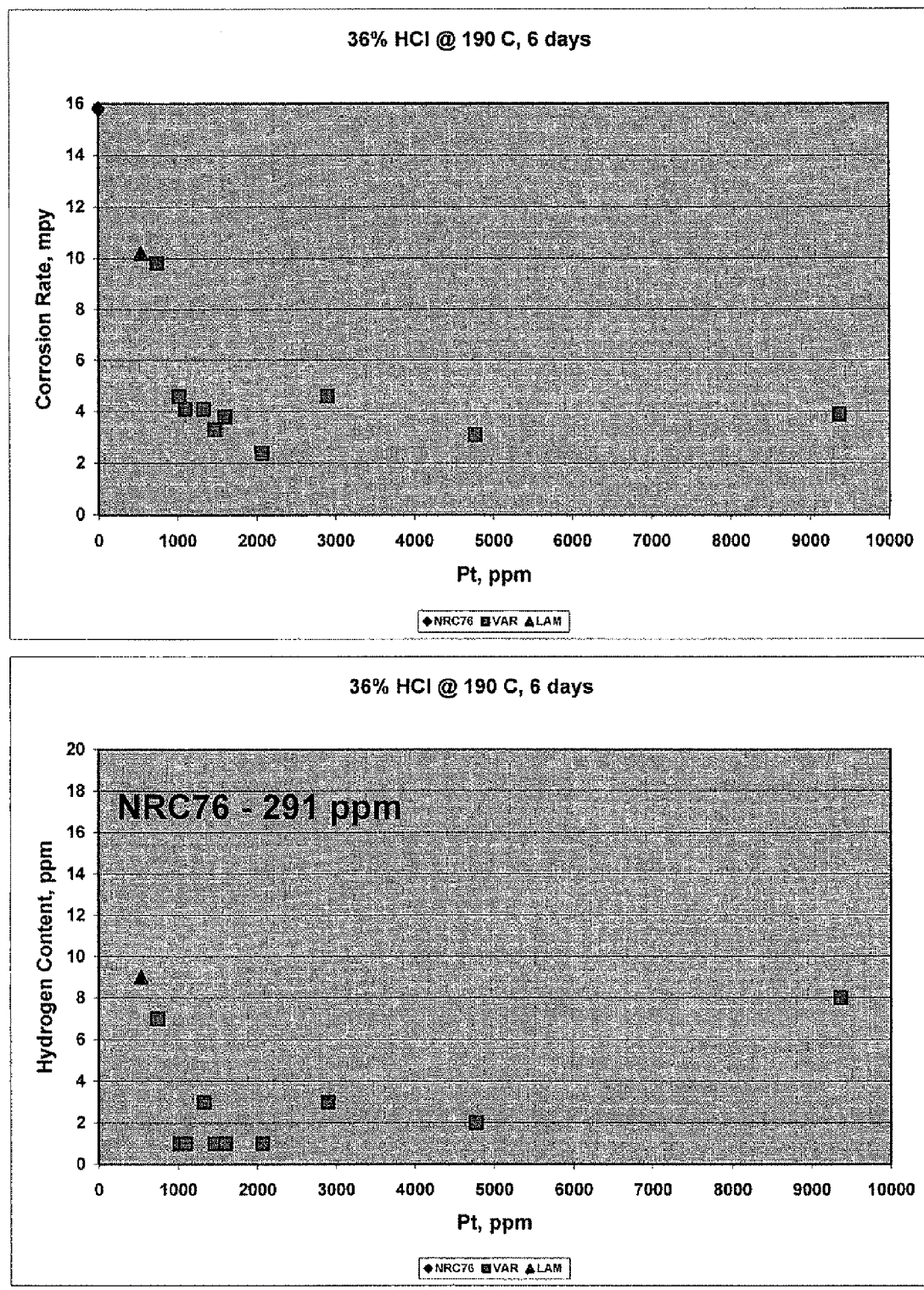
FIG. 4 illustrates the results for corrosion rate and hydrogen enrichment after short term corrosion tests in hydrochloric acid.

FIG. 4 shows the results for short term corrosion tests in hydrochloric acid. The platinum containing alloys have a significantly lower corrosion rate than the NRC76 alloy. This corrosion rate is reduced from approximately 16 mils per year (mpy) for NRC76 to less than 4 mpy when platinum concentrations exceed approximately 1000 ppm. In addition, the hydrogen concentration after testing has dropped from 291 ppm to less than 4 ppm when platinum concentrations are between approximately 1000 ppm to 10,000 ppm.

Figure 5:
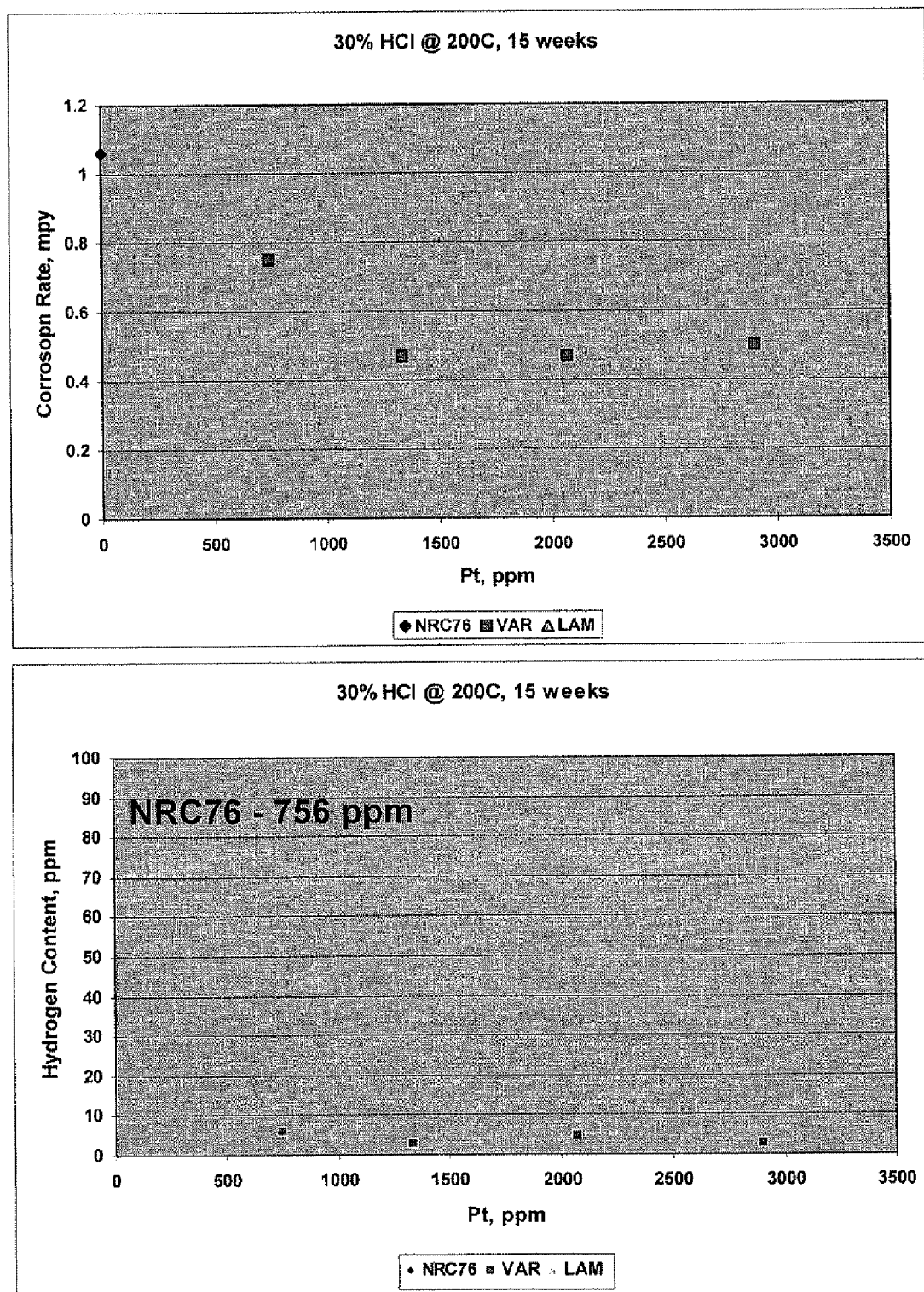
FIG. 5 illustrates the results for corrosion rate and hydrogen enrichment after long term corrosion tests in hydrochloric acid.

FIG. 5 shows the results for long term corrosion tests in hydrochloric acid. The platinum containing alloys had a corrosion rate that was three times lower than the NRC76 alloy when platinum concentrations exceed approximately 1000 ppm. In addition, the hydrogen concentration after testing has dropped from 756 ppm to less than 10 ppm when platinum concentrations were greater than approximately 1000 ppm.

Figure 6:
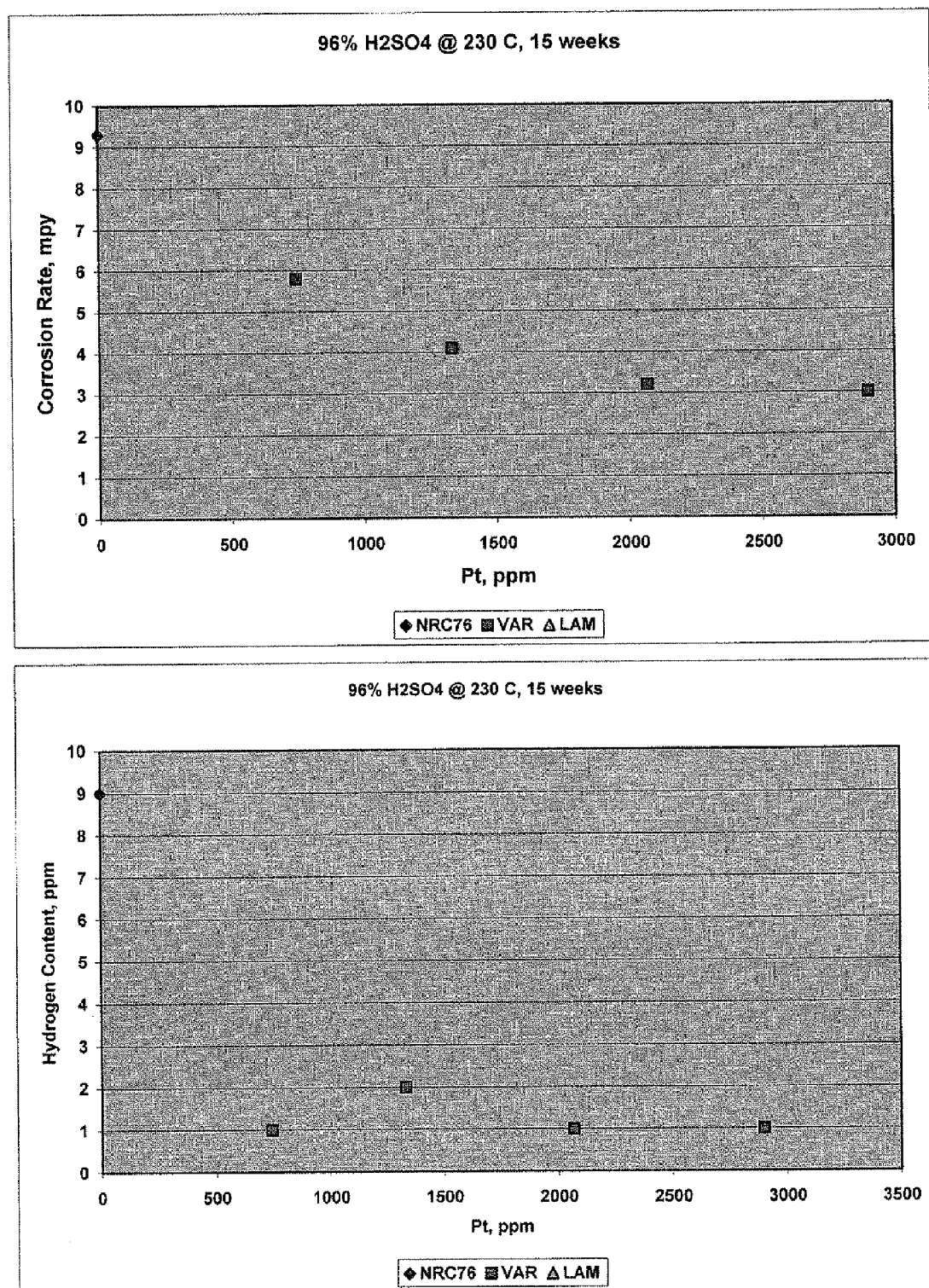
FIG. 6 illustrates the results for corrosion rate and hydrogen enrichment after long term corrosion tests in sulfur acid.

FIG. 6 shows the results for long term corrosion tests in sulfuric acid. The platinum containing alloys have a significantly lower corrosion rate than the NRC76 alloy. This corrosion rate is reduced from approximately 9.2 mils per year (mpy) for NRC76 to less than 4 mpy when platinum concentrations exceed approximately 1500 ppm. In addition, the hydrogen concentration after testing has dropped from 9 ppm to less than 2 ppm when platinum concentrations were greater than approximately 1000 ppm.

All the references described above are incorporated by reference in its entirety for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

We claim:

1. A tantalum alloy resistant to aqueous corrosion and consisting essentially of Ta-3W and Pt, wherein the Pt is present in an amount of at least 1,000 ppm and at most 2,000 ppm.

2. A tantalum alloy resistant to aqueous corrosion and consisting essentially of Ta-3W and Pt, wherein the Pt is present in an amount of 2,000 ppm.

3. A tantalum alloy resistant to aqueous corrosion and consisting essentially of Ta-3W and Pt, wherein (i) the tantalum alloy consists of Ta-3W and Pt, and (ii) the Pt is present in an amount of at least 1,000 ppm and at most 2,000 ppm.

4. A tantalum alloy resistant to aqueous corrosion and consisting essentially of Ta-3W and Pt, wherein (i) the tantalum alloy consists of Ta-3W and Pt, and (ii) the Pt is present in an amount of 2,000 ppm.

* * * * *